United States Patent Office 3,365,610
Patented Jan. 23, 1968

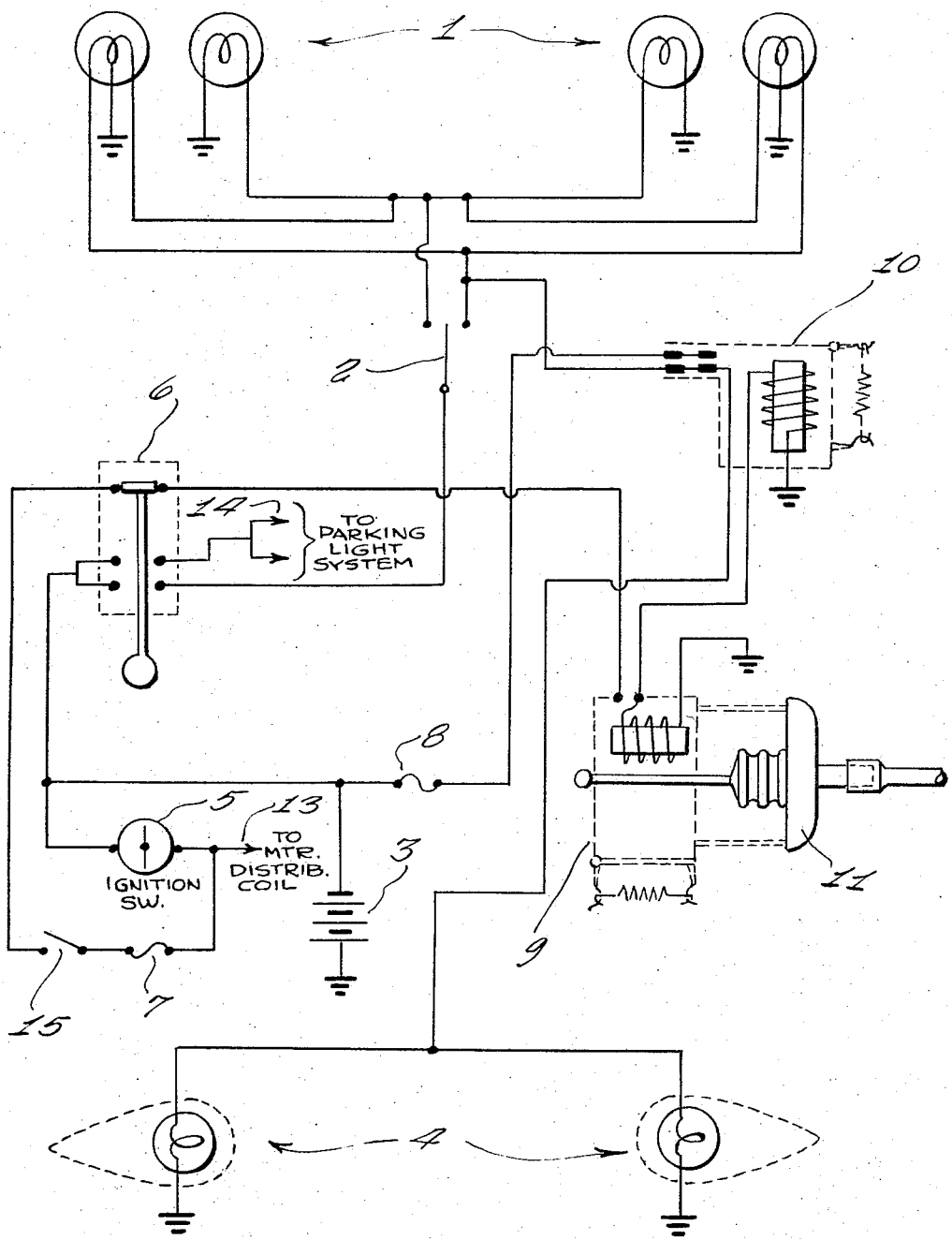

3,365,610
AUTOMATIC LIGHT SWITCHING SYSTEM
FOR MOTOR VEHICLE
Rudolph Novak, Clark County, Wis.
(Rte. 1, Box 100, Merrillan, Wis. 54754)
Filed Mar. 11, 1965, Ser. No. 438,954
1 Claim. (Cl. 315—83)

ABSTRACT OF THE DISCLOSURE

A switching system incorporated into the conventional lighting system of a motor vehicle for the purpose of selectively allowing one's low-beam headlamps and tail lamps to be on so as to allow the vehicle to be seen by the drivers of other vehicles, the system including a special switch, a mechanically closed relay switch incorporating a switch closer operated by motor vacuum, and an electrically operated relay switch interconnected together.

---

This invention relates to an automatic light switching system for motor vehicles and more particularly to be used for switching on the low beam headlights and tail lights for daytime driving where it is advisable to have one's lights on, not to see where one is going, but for safety reasons to make one's vehicle more noticeable to the other drivers on the road.

It is an object of the present invention to provide a means of having one's low beam head and tail lights burning on a motor vehicle whenever the operator of the vehicle thinks it advisable to do so, without the danger of accidentally leaving the lights on to drain the battery dead, since when the ignition switch is turned off, even momentarily, the automatic light switch will not come on until after the motor is restarted.

By the fact, that the lights cannot come on through this automatic switching system until after the motor starts running, there is no battery drain from the lights while the starter is cranking the motor.

Being that it is the object of this invention to switch on only the low beam headlights along with the tail lights, the operators of oncoming vehicles cannot be blinded by bright or high beam lights when this automatic switch is in use compared to manual switching of lights.

The figure represents the invention incorporated into a conventional lighting system of a motor vehicle as a separate system performing a separate duty.

Referring now specifically to the drawing we see a part of a conventional vehicle lighting system and how the present invention works with it.

Starting with reference letter number 1 of the figure, we see a conventional motor vehicle headlight system. Number 2 shows us a conventional headlight dimmer switch, while number 3 shows us a conventional electrical supply source for motor vehicles, while number 4 shows us the conventional tail lights of a motor vehicle, and number 5 shows us a conventional ignition switch.

All of the aforementioned items, numbers 1 through 5, are conventional and well known to those in the automotive trade.

Number 6 is a special switch that completes a circuit when pushed all the way in, where a conventional switch would normally be in an "off" position. When this switch is switched to any other position, this special circuit is opened. Otherwise, this switch performs all the duties of a conventional switch as is found on present day vehicles. Number 7 and 8 are protective fuses to protect the entire electrical system involved.

Number 9 is a mechanically closed electrical relay switch, whereas, number 10 is an electrically operated relay switch. Number 11 is a mechanical switch closer operated by motor vacuum.

Number 12 is the vacuum line leading to the motor intake manifold. Number 13 is the ignition wire leading from the ignition switch to the motor distributor coil on vehicles having an electrical ignition system.

Number 14 is the wire on a conventional switch leading to the parking light system. Number 15 is an "on-off" switch by which the present invention may be switched on or off to the motorist's choosing.

The operation of this invention will now be readily understood. The operator of the motor vehicle has switch 15 in the "on" position, and switch 6 in the position of being pushed all the way in, when he steps into the vehicle. Putting the key into the ignition switch 5 he starts the engine in the usual manner. As soon as the engine starts, a vacuum is formed in the line 12 which leads to the engine intake manifold. When this vacuum forms in the line 12 it exerts a pull on 11 which is a diaphragm that moves a pre-set distance, closing the electrical contact points on relay switch 9. By closing these points, current then flows into the coil of this relay switch preventing it from opening even if the vacuum should fail to exert its pull on the switch. By the closing of these points, current also flows to relay switch 10, causing it to close its electrical contact points. In closing the points on 10 it puts the dim, or low beam headlights, into operation along with the tail lights.

Should the operator stop the vehicle by turning off the ignition switch, relay 9 is deprived of electrical current causing it to open, which in turn opens the contacts on 10, thus automatically turning the head and tail lights off.

Should the operator of the motor vehicle feel that it is not necessary to have the low beam lights and tail lights on while driving, all he has to do is to put 15 to "off" position.

The regular lighting system of the vehicle may be used in any manner at any time independent of the automatic system, whether switch 15 is "on" or "off." Using the conventional part of the head and tail light switch, along with the conventional foot dimmer switch 2, automatically disconnects the automatic switch.

While this invention has been described with particular reference to the construction shown in the drawing, it shall be understood that such changes as are necessary may be made in the construction of said invention without departing from the spirit or scope thereof, as defined by the appended claim.

Having thus completely and fully described the invention, what is now claimed as new and desired to be protected by Letters Patent of the United States is:

1. In an automatic light switching system for motor vehicles, the combination with the conventional lighting system, a special switch, a mechanically closed relay switch, and an electrically operated relay switch, and an off-on switch, said conventional vehicle lighting system including head and tail lamps, a battery and ignition switch together with dimmer switch in circuit, said special switch having switching means to selectively close a circuit between one end of said off-on switch and a terminal of said mechanically closed relay switch, said off-on switch being connected at its other end to a pole of an ignition switch of the vehicle, said mechanically closed relay switch having one end of a coil connected to one end of a coil of said electrically operated relay switch, the other end of said coil being grounded, said mechanically closed relay switch having a switch closer secured thereto operated by motor vacuum, said electrically operated relay switch having means to connect a lead from an opposite pole of said ignition switch and a battery to the head and tail lamps of said vehicle, said connecting means of said electrically operated relay switch comprising said electrically operated relay switch carrying a first pair of engageable contacts one of which leads to said battery and the other to a contact of a headlight dimmer switch, said electrically operated relay switch also carrying a second pair of engageable contacts simultaneously engageable when said first pair of contacts are engaged, said second pair of contacts having one contact leading to the tail lights of said vehicle, and the other to said battery, said switching means of said special switch comprising said mechanically closed relay switch having said terminal connected to a pole of said special switch where it serves to close a circuit to said off-on switch when a plunger thereof is depressed manually, said terminal of said mechanically closed relay switch being engageable with said one end of said coil that communicates with said one end of the electrically operated switch coil.

References Cited
UNITED STATES PATENTS

| | | | |
|---|---|---|---|
| 2,669,664 | 2/1954 | Poznik | 307—10 |
| 2,671,207 | 3/1954 | Marsala | 315—79 X |
| 2,758,218 | 8/1956 | Poznik | 307—10 |
| 3,021,449 | 2/1962 | Kerr et al. | 315—79 |
| 3,206,637 | 9/1965 | Finken | 315—83 |

JAMES W. LAWRENCE, *Primary Examiner.*

P. C. DEMEO, *Assistant Examiner.*